March 8, 1927.
E. M. HAWKINS
1,619,975
TUBE CUTTING MACHINE
Filed July 14, 1923   3 Sheets-Sheet 1
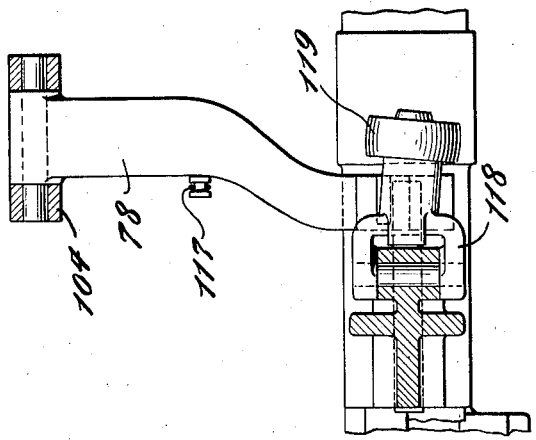
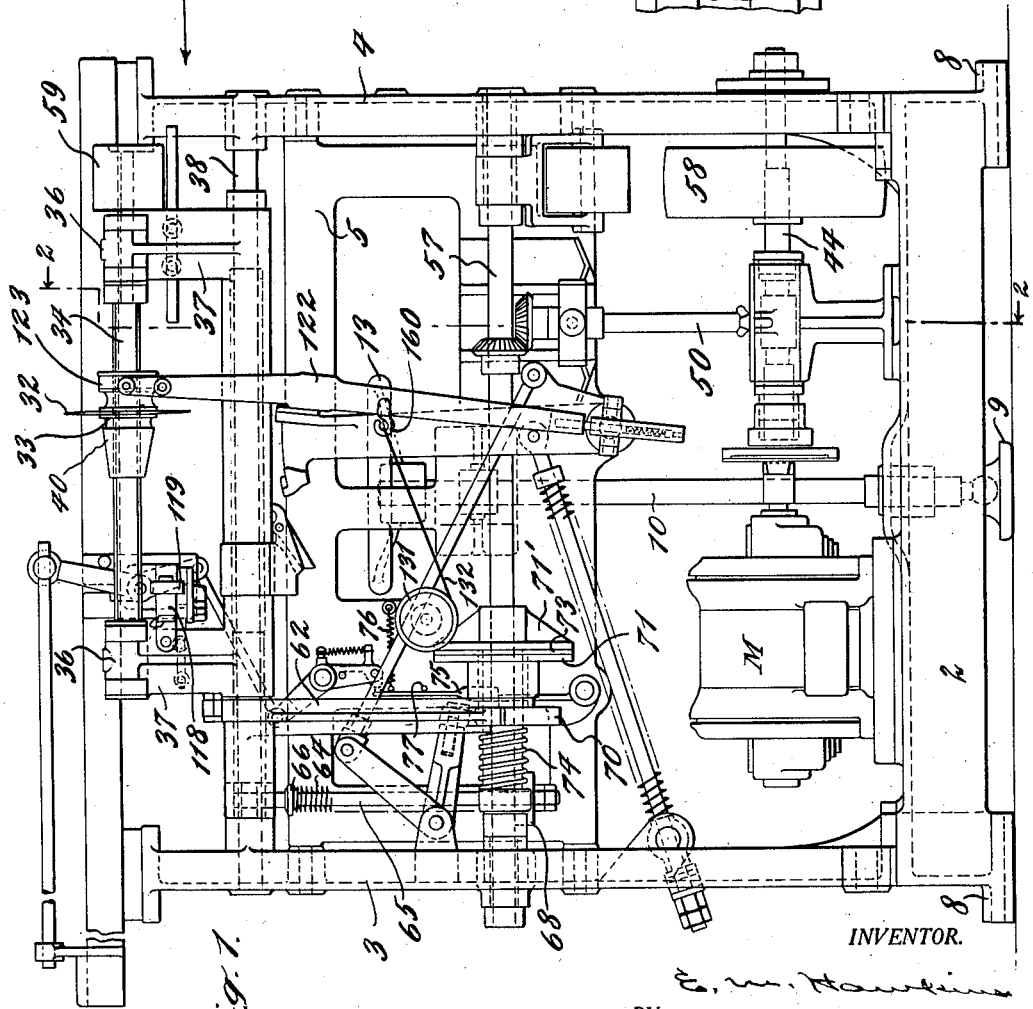
INVENTOR.
E. M. Hawkins
BY
ATTORNEY.

March 8, 1927. 1,619,975
E. M. HAWKINS
TUBE CUTTING MACHINE
Filed July 14, 1923 3 Sheets-Sheet 2
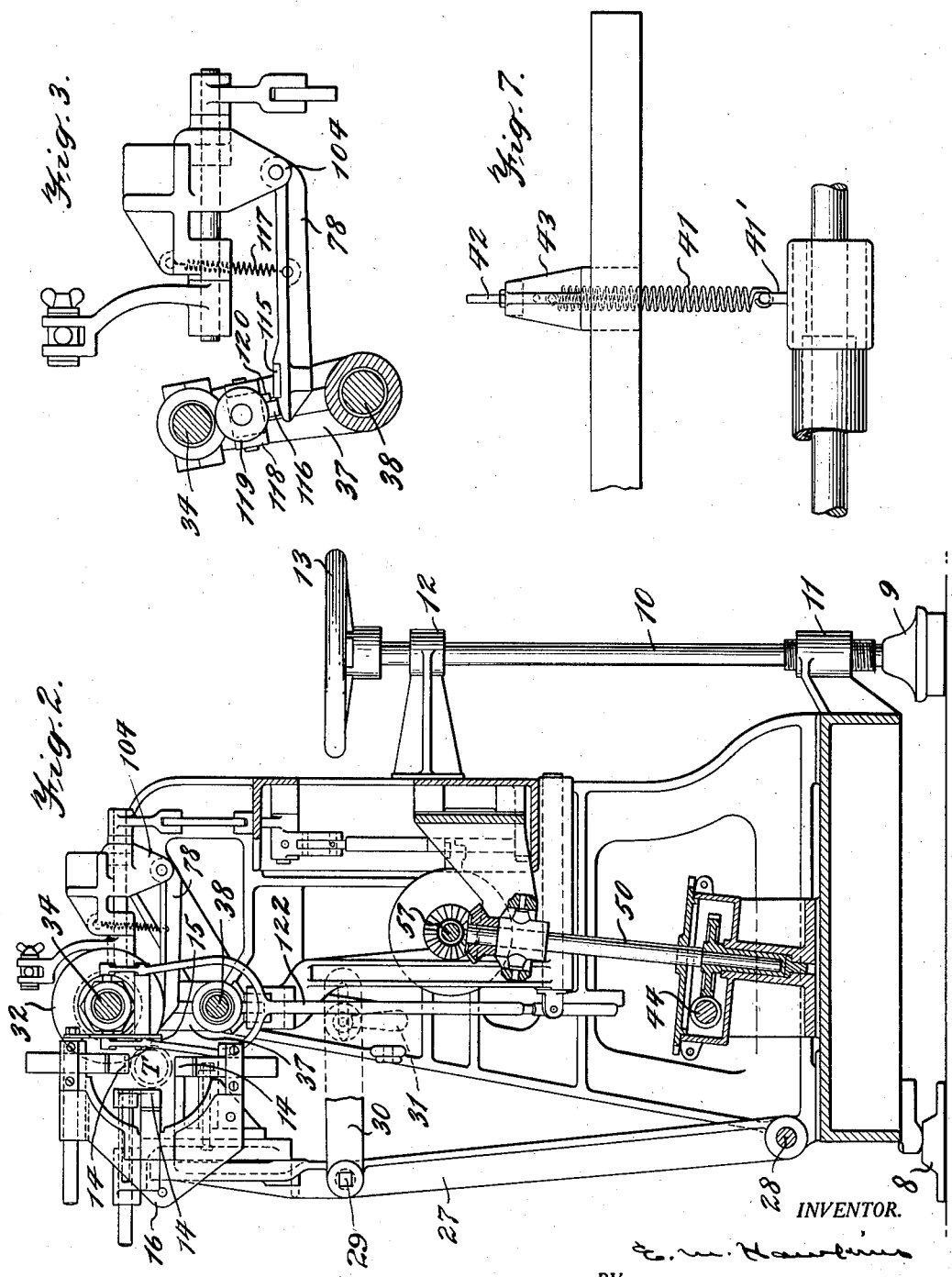
INVENTOR.
E. M. Hawkins
BY
ATTORNEY.

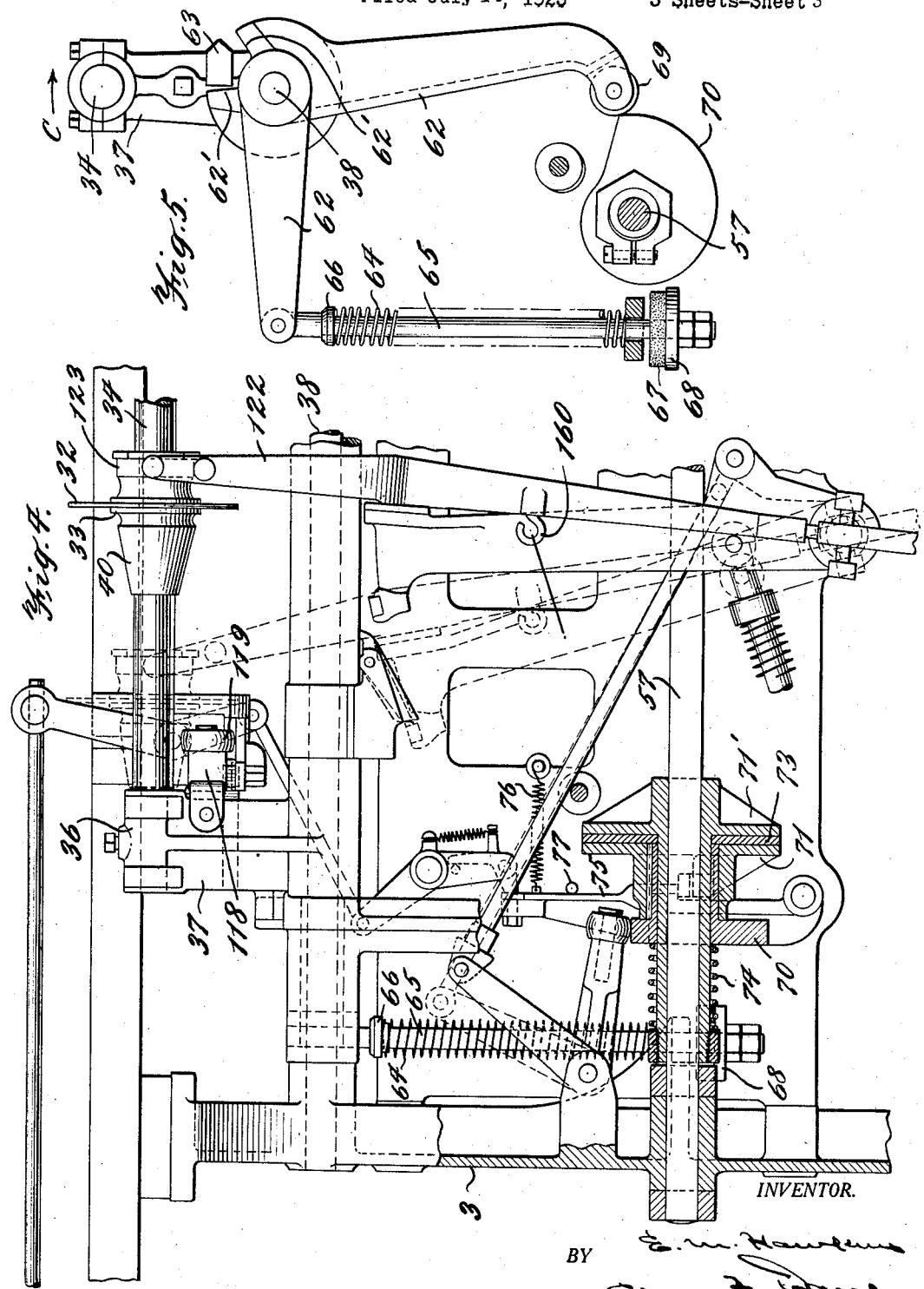

Patented Mar. 8, 1927.

1,619,975

UNITED STATES PATENT OFFICE.

EDGAR M. HAWKINS, OF ROCHESTER, NEW YORK, ASSIGNOR TO M. D. KNOWLTON COMPANY, OF ROCHESTER, NEW YORK, A CORPORATION OF NEW YORK.

TUBE-CUTTING MACHINE.

Application filed July 14, 1923. Serial No. 651,524.

This invention relates to mechanism for cutting long lengths of tubing, formed of paper or like material, into short sections, and it is particularly designed to be employed with a known forming machine which constantly delivers the tubing in a continuous length. The purpose of this association is to utilize the forced delivery from the forming machine to feed the tubing through the cutting mechanism and the latter will be described as so adapted. While the cutting mechanism is primarily designed for such an adaptation, yet other means may be employed for feeding the tubing through said mechanism.

In a cutting operation the constantly driven saw engages the travelling tubing and the two move along together while the tubing is rotated to complete the cut. If the travel of the tubing were depended on to carry the saw forward, there would be a tendency on the part of the saw to lag in its forward movement, owing to the inertia of its load and the friction of its connected moving parts on their supports. This lagging of the saw would tend to result in a spiral cut and the final separation would be effected by the breaking of the connecting strip between the overlapping ends of the spiral cut. Also this lagging of the saw would have a tendency to deflect the tubing from its proper path of travel, which tendency would be quite decided in a tubing with a thin wall. It has therefore been an object of the present invention to relieve the tubing and saw of any load during the cutting operation so that no deflecting push or pull will be exerted by either on the other, in this way assuring that the tubing will maintain its proper path of travel and that the cut will be made squarely across the tubing. This object I attain by the provision of means, preferably in the form of a spring motor, for moving the saw with the travelling tubing during the cutting operation.

Other objects and advantages will be pointed out in the detailed description of the invention which follows.

A complete tube cutting machine embodying, with others, the improvements constituting my present invention, is illustrated and described in detail in a companion application, Serial No. 660,154, filed August 30, 1923. I have therefore shown in the accompanying drawings only so much of a tube cutting machine as is necessary for the proper illustration of my present invention. In these drawings—

Figure 1 is a side elevation of a tube cutting machine embodying the invention, with the tripping and tube-guiding mechanism removed.

Fig. 2 is a vertical cross-section of the complete machine, on the line 2—2 of Fig. 1.

Fig. 3 is a detail view showing the latch for holding the saw arbor in position for the saw to engage the tubing.

Fig. 4 is an enlarged detail view, partly in section and broken away in parts, of the mechanism for controlling the movements of the saw.

Fig. 5 is a detail view showing the angular lever and its operating means for moving the saw to and from the path of travel of the tubing.

Fig. 6 is an enlarged detail, partly in section, showing a plan of the latch for holding the yoke with the saw in tube cutting position.

Fig. 7 is a detail showing the spring and its connections for pulling the saw away from the path of travel of the tubing.

The present tube cutting machine is designed to co-operate with a known machine, not shown, for winding spiral tubing, and in the joint operation of the two the cutting machine is placed at the delivery end of the winding machine so that the line of travel of the tubing from the winding machine will coincide with the axis of operations in the cutting machine and the feed of the tubing in the winding machine will carry it through the cutting machine.

The supporting frame of the present machine is generally rectangular in form and comprises the base 2, the ends 3, 4 and the girder 5 extending between said ends. This frame is adapted to be supported on the floor or other support in a manner to be capable of rocking adjustment, for a purpose to be hereinafter referred to, and to provide for this it has fulcrum shoes 8, 8, at the two front corners thereof, as shown in Figs. 1 and 2, and a swivel shoe 9 at the rear in an intermediate position. The swivel shoe 9 is carried by a rod 10 which is supported in two bracket arms 11 and 12 at the rear side of the frame, the said rod being threaded at its lower end in the bracket 11 and at its upper end being provided with an operating hand-wheel 13. By turning the rod in the proper direction with the swivel shoe 9 bearing on the floor, the frame with the several parts mounted thereon constituting the cutting machine can be rocked or tilted on its fulcrum shoes to provide an angular adjustment that may be employed in properly alining the cutting machine with the winding machine, and also in effecting proper adjustment of the cutting saw carried on the frame in relation to the path of the tubing.

The rotating tubing enters the cutting machine on the line indicated by the arrow at the upper right-hand corner of Fig. 1, and at T in Fig. 2. As the tubing enters the machine it is engaged and properly directed into and through the machine by the guides 14 and 15. These guides are adjustably mounted on a bracket 16 carried at the upper end of an auxiliary frame 27 (Fig. 2) which is pivoted at its lower end on a rod 28 in the lower part of the main frame. This auxiliary frame is adjus'ably connected with the main frame by suitable means, here shown as a link 30 connecting at one end with a rod 29 on the auxiliary frame and at its opposite end with the main frame by a clamping screw 31 engaging the link through an elongated slot therein. With this adjustment of the auxiliary frame, the tube-guiding means carried thereby may be adjusted as a whole relatively to the required path of travel of the tubing through the machine.

The saw 32 is carried by a sleeve 33 splined on a mandrel 34, which is journaled at its ends in the opposite bearings 36, 36, of a yoke 37, the usual bushings and collars being provided in the bearings to prevent longitudinal movement of the mandrel in the yoke. The intermediate part of the yoke provides a tubular bearing which is journaled on a shaft 38 held in the frame ends 3 and 4. Suitable collars on the shaft 38 adjacent the ends of the yoke hold the latter against longitudinal movement on said shaft. The sleeve 33 carrying the saw has a cone 40 at one end and an annular groove in the other end, the purpose of which will be explained further on. The saw 32 is normally held away from the line of travel of the tubing by a spring 41 (Fig. 7) under tension. This spring is attached at one end to an arm of the yoke 37, as at 41', and at the other end to a bolt 42 carried by a stationary bracket 43. By turning the nut on the bolt 42 the tension of the spring can be adjusted.

Means are provided for rotating the saw and for driving other parts of the mechanism. On the base frame member 2 is mounted a motor M having a flexible driving connection with a shaft 44. Motion is transmitted from this shaft 44 to the saw mandrel 34 for imparting a continuous rotating movement to the saw, by a belt (not shown) engaging pulleys 58 and 59 mounted respectively on the driving and driven parts.

The saw-carrying yoke is adapted to be swung forward against the tension of the spring 41 to project the saw from its inoperative retracted position to an operative cutting position in the path of the travelling tubing. Any suitable means may be employed for doing this. In the present case I employ the means disclosed in the aforesaid companion application. This comprises an angular lever 62 journaled on the shaft 38 and having approximately horizontal and vertical arms. At the bend of the lever, where it is journaled on the shaft 38, is a sleeve or hub that is cut away to form two opposite jaws 62' for engaging an interposed stop projection 63 on the yoke 37. The space between the jaws is slightly greater than the width of the stop so that the latter has some play therebetween. With the angular lever in its normal position, as shown in Fig. 5, the spring 41 (Fig. 7) holds the yoke so that the stop 63 bears against the jaw 62' to the left, as shown in said figure, and the yoke is held in an upright position with the saw away from the travel of the tubing. A clock-wise turning of the hub will likewise turn the yoke, as indicated by the arrow C, against the pull of the spring 41, and thereby throw the saw into the travel of the tubing. The jaw 62' to the right is a safety factor. Under ordinary conditions it will not contact with the stop 63, but should there be an excessive throw of the yoke from any cause or should the spring 41 fail, the jaw on the right would engage the stop and limit the movement of the saw toward the travel of the tubing.

The angular lever 62 is caused to actuate the yoke by the pressure of a coiled spring 64 compressed on a vertical rod 65 which is hinged at its upper end to the horizontal arm of the lever and at its lower end passes through a guide lug on the frame end 3. This spring is compressed between the guide lug and a collar 66 on the upper end of the rod and normally tends to move the rod upward to lift the outer end of the horizontal arm of the lever. The upward movement of the rod is limited by a stop, formed by a rubber washer 67 and disc 68 held on its lower end by nuts, striking the guide lug, the rubber washer acting as a cushion to absorb the jar caused by the stopping of the rod. The upward movement of the rod is limited so that the angular displacement of the lever 62 will turn its hub just enough to move the yoke to a position to bring the supported saw into the travel of the tubing.

The actuation of the angular lever 62 by the spring 64 is controlled by mechanism operating on the end of the vertical arm of the lever. On the lower end of this vertical arm is a friction roll 69 adapted to be engaged by a cam 70 carried by a shaft 57 which is driven constantly from the motor driven shaft 44 through an intermediate vertically arranged shaft 50 and suitable connecting gearing (Figs. 1 and 2). This cam 70, as best shown in Fig. 4, is rotatable on the hub sleeve of a clutch member 71' keyed on the shaft 57 and has a hub extension projecting in and keyed to a like extension of a loose clutch member 71. Interposed between the clutch members 71 and 71' is a fibre disc 73. A spring 74 on the hub sleeve of the member 71' is compressed between a nut on said sleeve and the cam 70. The pressure exerted by this spring clamps the two members 71 and 71' upon the friction disc and if other provision were not made the clutch members and the cam 70 would rotate with the shaft. But the member 71 is held by a lever 75 against rotation, the lever being notched to engage a block on the adjacent side of the member 71, as shown by dotted lines in Fig. 4. The lever 75 is normally held by a spring 76 to engage the member 71. At timed intervals, however, the lever is moved to disengage the clutch member 71 so that the latter can turn with the member 71' with a consequent rotation of the cam 70, but the disengagement is only momentary and the lever is returned by the spring 76 to again engage the block on the member 71 and stop rotation of the cam when the latter turns to its initial position. In consequence of this the cam only makes one complete revolution at each release of the clutch mechanism.

The cam 70 is shown in its initial position in Fig. 5, that is, in its stopped position when the lever 75 is in engagement with the clutch member 71 as shown in Fig. 4. When this clutch member 71 is released, the cam is rotated clock-wise and the vertical arm of the lever 62 is released and this permits the spring 65, acting on the rod 64, to raise the outer end of the horizontal arm of the lever, which angularly displaces the lever as a whole and, through the engagement of one of the jaws 62' on the lever hub with the lug 63 on the yoke 37, the latter is moved against the pull of the spring 41 to throw the saw into the travel of the tubing as has been previously explained. When the saw is so moved the yoke is engaged by a latch 78 (Fig. 3) and held in contact with the tubing until the cut is completed and the latch released by means hereinafter described. As the cam 70 continues to rotate it bears on the lower end of the vertical arm of the angular lever 62 and moves the lever as a whole to release the saw yoke so that the latter can be returned by the spring 41 to its original position when released by the latch 78. This movement of the lever also compresses the spring 64 and as the cam completes its revolution it is stopped again in its initial position by the engagement of the lever 75 with the clutch member 71.

A suitable tripping mechanism is provided for operating the lever 75 to release the clutch member 71 in its sequential order in the cycle of operations of the different mechanisms, but as this forms no part of my present invention it will not be described in detail herein, the same being fully disclosed in the aforesaid companion application.

When the yoke 37 is moved, as heretofore explained, to throw the saw into the tubing, it is engaged by a latch 78 (Fig. 3) hinged to the bracket 104 and is held thereby until a tube section is severed. On the free end of the latch is a block 115 that engages a square bar 116 on the yoke when the latter is moved to the left and in a direction toward the tube, as shown in Fig. 3. The latch is held in engagement with said bar by a spring 117. When a sawing operation is completed the latch is disengaged from the bar 116 by a lever 118 pivoted at one end to the yoke and carrying a roll 119 on its free end. On the under side of this lever is a lug 120 that will contact with the latch 78 when the lever 118 is depressed. When the saw completes a cutting operation the sleeve 33 will have moved to the left and the conical end 40 of the sleeve bears on the roll 119 and depresses the lever 118 so that the lug 120 trips the latch 78 from the square bar 116 and the yoke is thereby freed so that it can be pulled away from the travel of the tubing by the spring 41.

During a cutting operation it is desirable, as hereinbefore referred to, that the saw travel with the feed of the rotating tubing so that the cut will be made squarely across the tubing. The movement of the saw toward the tubing is just enough for it to cut through the wall thereof and as the tubing is rotated the kerf extends around the same and its two ends should meet to give a square cut. To obtain this result means are provided for moving the saw along its mandrel during the cutting operation at the same rate of travel as the tubing.

The means employed for so moving the saw comprise a lever 122 pivoted at its lower end and forked at its upper end. The forked end straddles the saw yoke and between its members is pivoted a collar 123 journaled on the saw sleeve 33 in an annular groove therein, trunnions on the collar having bearings in the fork ends forming the connection.

In the usual cutting operation the saw is primarily carried forward on its mandrel by its engagement with the travelling tubing. Owing to the friction of bearing surfaces, inertia of connected parts and other factors, there is a tendency of the saw to lag and if provision were not made to prevent it, the movement of the tubing would be obstructed with possible deflection and the saw would make a spiral instead of a square cut across the tubing. To offset this tendency an auxiliary motor is provided to aid the tubing in the propulsion of the saw along its mandrel. This auxiliary motor 131 (Fig. 1) is mounted on the frame of the machine and comprises a spring-actuated winding drum having connection with one end of a tape 132, the other end of which latter is attached to the lever 122 at 160. The spring contained in this winding drum, indicated by dotted lines in Fig. 1, acts to normally rotate the drum in a direction to advance the lever 122 and its load so that no resistance is offered by the saw to the progress of the engaged tubing as the latter is fed through the machine. The engagement of the tubing with the saw controls the movement of the latter so that there is an equal movement of both and this insures a smooth even kerf normal to the axis of the tubing.

Means are provided for automatically returning the saw to its initial position after a cutting operation. These means may be any suitable for the purpose, but preferably will be such as fully described in the aforesaid companion application.

The operation of the machine, in brief, is as follows: The cutting machine is positioned relatively to the machine for forming the tubing so that the axes of travel of the tubing through both machines are identical. The tubing is constantly delivered from the forming machine and this movement is utilized to feed the material through the cutting machine of the present invention. In the forming machine a rotary movement is imparted to the tubing and, of course, this is continued in the cutting machine.

In adjusting the cutting machine to the path of travel of the tubing from the forming machine, the auxiliary frame 27 may be swung on its pivot in the main frame to bring the guide members carried thereby in proper position to receive the tubing from the forming machine, and the main frame in turn may be rocked on its fulcrum shoes to properly position the saw to the tubing according to the size or diameter of the latter. After these adjustments the advancing tubing operates a tripping mechanism which brings into operation the means for projecting the saw into cutting position in the path of travel of the tubing and thereafter carrying it through its regular cycle of operations ending in its return to starting position.

The saw is constantly rotated by its belt drive and it cuts through the wall of the tubing. The throw of the yoke is limited so that the cut extends but slightly through the wall of the tubing (Fig. 2) and separation is completed by the rotation of the tubing. As the saw cuts into the tubing it is moved along with the same by the action of the spring motor 131, the saw being easily moved along its mandrel as its load is so balanced and carried that no resistance is offered to the progress of the tubing. As the tubing is rotated on its center the cut is completed while the saw moves but a short distance along its mandrel. As the saw is relieved of its load and as the material of the tubing is quite stout, there will be no deflecting pressure on the abutting end of the tubing and the kerf will be made squarely across the tubing without any overlap and a clean separation of the tube-section will be obtained. The severed tube-section falls into a suitable receptacle provided for the purpose.

When the saw approaches the end of the travel on its mandrel and after a tube-section has been severed, the cone 40 on its sleeve 33 depresses the lever 118 to disengage the latch 78 from the yoke 37. The latter being freed is pulled by the spring 41 away from the travel of the tubing and the new end progresses forward, clear of the saw, to operate the trip mechanism to start another cutting operation.

What I claim is:

1. In a tube cutting machine, the combination with means for guiding a travelling tubing into the machine, a saw mounted for transverse and parallel movements relative to the travel of the tubing, means operative to project the saw into the path of travel of the tubing and latching means holding the saw to such position during a cutting operation, of yielding means operative to move the saw parallel with the travel of the tubing during a cutting operation.

2. In a tube cutting machine, the combination with means for guiding a travelling tubing into the machine, a saw mounted for transverse and parallel movements relative to the travel of the tubing, trip-controlled means operative to project the saw into the path of travel of the tubing and latching means holding the saw to such position during a cutting operation, of means operative to move the saw parallel with the travel of the tubing during a cutting operation.

3. In a tube cutting machine, the combination with means for guiding a travelling tubing into the machine, of a saw mounted for transverse and parallel movements relative to the travel of the tubing, means operative to project the saw into the path of travel of the tubing, separate latching means positively holding the saw to such position during a cutting operation, and means movable with the saw in its travel with the tubing for releasing said latching means upon the completion of a cutting operation.

4. In a tube cutting machine, the combination with means for guiding a travelling tubing into the machine, of a saw mounted for transverse and parallel movements relative to the travel of the tubing, means operative to project the saw into the path of travel of the tubing, a pivoted latch for holding the saw to such position during a cutting operation, and means movable with the saw in its travel with the tubing for releasing said latch upon the completion of a cutting operation.

5. In a tube cutting machine, the combination with means for guiding a travelling tubing into the machine, of a saw mounted for transverse and parallel movements relative to the travel of the tubing, means operative to project the saw into the path of travel of the tubing, a pivoted latch for holding the saw to such position during a cutting operation, and a member movable with the saw in its travel with the tubing having an inclined surface for effecting a release of the latch upon the completion of a cutting operation.

6. In a tube cutting machine, the combination with means for guiding a travelling tubing through the machine, of a pivoted yoke having a mandrel journaled therein, a sleeve slidable on said mandrel in a direction parallel with the travel of the tubing and having a rotatable saw mounted thereon, means normally holding the yoke with the saw retracted from the path of the tubing, means for moving the yoke to project the saw into operative position in the path of the tubing, a latch for engaging the yoke and holding the saw to its said operative position, and means carried by the sleeve in its travel with the tubing for releasing said latch upon the completion of a cutting operation.

7. In a tube cutting machine, the combination with means for guiding a travelling tubing through the machine, of a pivoted yoke having a mandrel journaled therein, a sleeve slidable on said mandrel in a direction parallel with the travel of the tubing and having a rotatable saw mounted thereon, means normally holding the yoke with the saw retracted from the path of the tubing, means for moving the yoke to project the saw into operative position in the path of the tubing, a latch for engaging the yoke and holding the saw to its said operative position, and a cone-shaped member carried by the sleeve in its travel with the tubing for effecting a release of said latch upon the completion of a cutting operation.

8. In a tube cutting machine, the combination with means for guiding a travelling tubing through the machine, of a pivoted yoke having a mandrel journaled therein, a sleeve slidable on said mandrel in a direction parallel with the travel of the tubing and having a rotatable saw mounted thereon, a spring normally holding the yoke with the saw retracted from the path of the tubing, means for moving the yoke to project the saw into operative position in the path of the tubing, a latch for engaging the yoke and holding the saw to its said operative position, and means carried by the sleeve in its travel with the tubing for releasing said latch upon the completion of a cutting operation.

9. In a tube cutting machine, the combination of two frames, one having a saw mounted thereon and the other having means for guiding a travelling tubing through the machine to be cut by said saw, and means for adjusting said frames relatively to each other in a direction transversely of the travel of the tubing.

10. In a tube cutting machine, the combination of two frames, one having a saw mounted thereon and the other having means for guiding a travelling tubing through the machine to be cut by said saw, said frames being supported for rocking movement relatively to each other in a direction transversely of the travel of the tubing, and means for holding the frames in adjusted position.

11. In a tube cutting machine, the combination of a main frame having a saw mounted thereon, an auxiliary frame having means for guiding a travelling tubing through the machine to be cut by said saw, the said main frame being mounted for rocking movement independently of the auxiliary frame in a direction transversely of the travel of the tubing, and means for rocking said main frame and holding it in adjusted position.

12. In a tube cutting machine, the combination of a main frame having a saw mounted thereon, an auxiliary frame having means for guiding a travelling tubing through the machine to be cut by said saw, each of said frames being supported for independent rocking movement in a direction transversely of the travel of the tubing, the auxiliary frame being pivoted on the main frame, and means for holding the frames in adjusted positions.

13. In a tube cutting machine, the combination with means for guiding a travelling tubing, of a frame having mounted thereon a tube cutting saw and operating means therefor, a fulcrum support on which said frame is mounted at one side thereof, and means engaging the frame at its opposite side for rocking the same on its fulcrum support in a direction transversely of the travel of the tubing and holding the same in adjusted position.

In testimony whereof I affix my signature.

EDGAR M. HAWKINS.